Patented Dec. 10, 1929

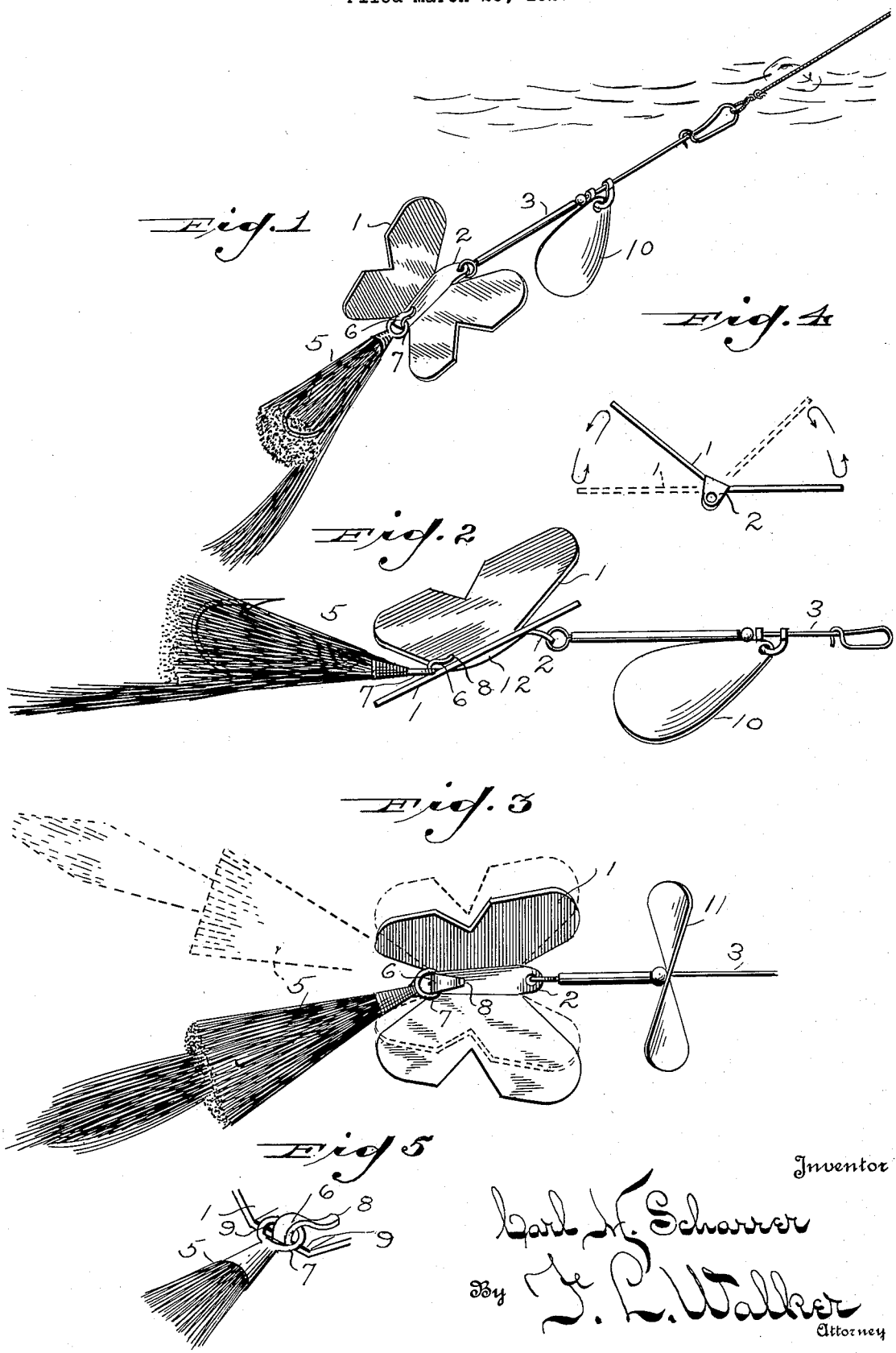

1,738,617

UNITED STATES PATENT OFFICE

CARL H. SCHARRER, OF DAYTON, OHIO

FISHING LURE

Application filed March 23, 1927. Serial No. 177,694.

My invention relates to artificial fish baits and more particularly to a lure, including a plate having a fluttering action or transverse rocking movement in the water which is peculiarly attractive to fish.

Many forms of fish lure have been devised wherein the lure or artificial bait has an undulating movement in a vertical direction when drawn through the water, or wherein the lure is given a transverse wiggling or wobble movement, or wherein the lure is caused to dart abruptly in various directions. The present form of lure, however, differs from all of these by embodying a lure plate, which is preferably, though not necessarily, shaped somewhat in imitation of a moth, the wings of which are angularly disposed and which is drawn through the water in a somewhat inclined relation to the line of draft whereby the water pressure acting first on one wing and then the other gives to the lure plate a transverse rocking or fluttering action, which movement is controlled or governed by the side sway or transverse oscillation of a trailing portion, which is preferably, though not necessarily, a buck tail fly. This trailing element is attached to the lure plate for free swinging movement in a transverse direction and is capable of a rising movement but the connection is such as to limit the descent of the trailing portion or bucktail in relation with the lure plate. A draft connection is provided for the lure plate in spaced relation with the forward terminal whereby the plate is inclined to the line of draft and a spoon or other form of spinner is preferably, though not necessarily, mounted upon the draft connection in advance of the lure plate.

The object of the invention is to provide an artificial bait or lure which will be effective in attracting fish and which will be simple and economical in construction and unlikely to get out of repair.

A further object of the invention is to provide an improved form of lure plate which will possess a peculiar fluttering or transverse rocking movement when drawn through the water.

A further object of the invention is to provide means for controlling or governing the rocking movement of the lure plate by the transverse oscillation of a trailing element.

A further object of the invention is to provide an improved means for connecting a lure plate and trailing element for an artificial bait, whereby the trailing element will be free for oscillatory movement in transverse and upward directions, but will be prevented from the descent or falling movement.

A further object of the invention is to provide a lure plate which when drawn through the water will assume an upwardly and forwardly inclined position, and possess a tendency to ascend in the water.

A further object of the invention is to provide a lure plate having the form and appearance of a moth.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawing wherein is shown the preferred, but obviously not necessarily, the only form of embodiment of the invention, Fig. 1 is a perspective view of the assembled fish lure forming the subject matter hereof. Fig. 2 is a side elevation of the assembled lure. Fig. 3 is a top plan view thereof showing in dotted lines the alternative positions of the lure plate and trailing member and also illustrating a modified form of spinner. Fig. 4 is a front elevation of the lure plate showing in dotted lines the range of oscillatory or transverse rocking movement. Fig. 5 is a detail view of the connection of the trailing fly and lure plate.

Like parts are indicated by similar characters of reference throughout the several views.

Referring to the accompanying drawings, 1 is the lure plate which is indented at both its forward and rearward ends and also on its lateral margins. The terminal and lateral indentations of the plate 1 give it a substantially X shape. The ends of the arms of such X shaped plate are somewhat rounded. The plate is of a general trapezoidal shape, somewhat more narrow at its rear than at its forward portion. The lateral halves of the indented plate are bent upwardly into an obtuse angular relation with each other or wide V shape. Upon the whole the lure plate possesses the approximate shape and appearance of a species of moth which is hatched upon the water and which affords a generous food supply for the fish at certain seasons of the year. At its forward extremity and within the forward indentation the lure plate 1 is provided with a lug or ear 2, for the attachment of a draft device 3. The attachment of the draft device may be through a simple hole in the forward portion of the lure on substantially the medial line thereof. It is not essential that the lug or ear 2 be downturned as shown in the drawing. However, this point of attachment of the draft device 3 is somewhat to the rear of the forward ends of the wing portions of the lure plate. The point of attachment is such that as the lure plate is drawn through the water it assumes an upwardly and forwardly inclined diagonal position as shown more particularly in Fig. 2. The water pressure on the under side of the plate tends to lift the plate and maintain it elevated in the water. Thus, while not of buoyant character, the lure is to a certain extent self supporting while being trolled through the water. This action may be compared somewhat to that of a kite to which the kite string is attached in somewhat similar relation to the attachment of the leader or draft device 3 with the lure plate to induce by action of air currents an effect upon the kite similar to that induced by water pressure on the lure plate.

The wings of the lure plate being divergently disposed present to the action of the water pressure one of the wings in broadside relation while the other wing is presented in an angling or divergent relation to the line of draft. The result is that the water pressure upon the respective wings will be unequal. This preponderance of water pressure upon one wing will cause the lure plate to tilt or to rock transversely about its medial line as an axis thus presenting the opposite wing broadside to the water pressure, thereby inducing a return oscillation. To govern this transverse rocking motion and hold the lure plate with first one then the other wing in position to receive maximum water pressure and to momentarily resist the tilting of the lure plate there is provided an oscillatory trailing member, in this case a bucktail fly. Obviously, other forms of flies having concealed hooks may be substituted for that illustrated. The trailing member 5 is flexibly attached to the lure plate within the rear indentation thereof. The mode of attachment is such that the trailing member or buck tail 5 may freely swing to and fro across the medial line of draft in a transverse direction. The trailing member or buck tail 5 is also free to rise to an inclined position above the lure plate. The connection, however, is such that the descent of the bucktail or trailing member 5 is limited.

While various methods of attaching the trailing element or bucktail 5 may be employed, the preferable form illustrated in the drawing is by means of a hook 6 formed at the rear of the lure plate 1 and within the indentation. This attachment hook preferably, though not necessarily, comprises a tapered tongue of material bent upwardly and forwardly over the medial portion of the lure plate. With this tongue there engages an eye 7 formed upon the bucktail or trailing element 5. The tapered tongue 6 forming the hook is sufficiently wide at its base or point of attachment to the lure plate to substantially fill the eye 7 of the bucktail and limit further downward sliding movement of the bucktail thereon. This limits the descent of the bucktail or trailing element 5 but permits free movement thereof both transversely and upwardly so long as the eye of the trailing element remains upon the upper and forward portion of the hook. For convenience of attachment and detachment or substitution of flies of different character, color or size, the hook 6 is preferably slightly resilient with its forward terminal approaching closely to the top of the lure plate and slightly upturned as at 8 to facilitate the engagement of the eye of the bucktail fly 5 thereunder. In lieu of the limiting means for the trailing element 5 heretofore mentioned there is shown in Fig. 5 a detail perspective view wherein the hook is bent upwardly and forwardly quite abruptly to the body of the plate 1 leaving at the opposite sides of the hook 6 stop shoulders 9 with which the eye 7 of the trailing element engages, to limit its descent relative to the plate.

As the lure plate rocks to and fro, the trailing element 5 or bucktail is given a slight twisting movement in the water and it tends to fall or turn thence towards the side of the lowermost wing of the lure plate. The bucktail or trailing element inclining toward the lure plate wing which is presented broadside to the water pressure adds its resistance momentarily to the returning oscillation of the plate under the influence of water pressure. It thus tends to hold the plate in such position until the accumulation of pressure is sufficient to reverse the plate and with it the trailing element or bucktail 5. The reversal movement being initiated, the bucktail then by its momentum and weight serves to carry the plate to its opposite extreme position presenting the opposite wing of the lure plate broadside to the water pressure. It thus prevents the plate from assuming an intermediate or balanced position. Thus the trailing element while momentarily resisting the rocking movement of the plate to opposite positions subsequently facilitates such movement and insures a full movement of the plate by adding its own influence to that of the accumulated water pressure. The result of this action then is, that the lure plate is given a fluttering movement, or to and fro rocking movement transversely to the line of draft, simulating the struggle of a moth in the water. The lure plate 1 is preferably of highly polished metal, although other materials may be employed. In lieu of a polished surface the plate may be colored in one or more colors. On the draft device 3 there is preferably, though not necessarily, mounted a spinner element which may either be a simple conventional type of spoon as shown at 10 or it may be a propeller type of spinner as illustrated at 11. Such spinner is not an essential element but is desirable to afford agitation in the water serving to attract the attention of the fish. In lieu of the draft device 3 and spinner 10 the leader or line may be connected directly to the lure plate 1.

Although not necessary nor essential, a keel 12 (Fig. 2) may be provided medially on the under side of the lure plate or coincident with the line of draft. Such keel not only serves as a ballast weight to insure the lure turning with the right side upward in the water, but will also operate to steady the plate in the water by maintaining it in its course, while permitting free transverse rocking movement.

From the above description it will be apparent that there is thus provided a construction of the character described possessing the particular features of advantage before enumerated as desirable but which obviously is susceptible of modification in its form, proportions and arrangement of parts, without departing from the principle involved or sacrificing any of its advantages.

While in order to comply with the statute the invention is described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A fishing lure including a concavo-convex plate having its concave side upwardly disposed and comprising angularly disposed wing portions extending on opposite sides of a medial line of draft and presented alternately in opposition to the water pressure thereby affording unbalanced resistance shifted alternately from one wing to the other to one end of which a draft connection is made, and a trailing portion connected thereto in spaced relation with the point of attachment of the draft connection for transverse oscillatory movement to and fro across the medial line of draft.

2. In a fishing lure, a lure plate of concavo-convex form having its concave side uppermost and upwardly and forwardly inclined to the line of draft to present its respective halves in different alternating angular relation to the water pressure to afford a transverse rocking movement to and fro about an axis substantially coincident with a medial line of draft, and a trailing portion having a transverse swinging movement from side to side coincident with the transverse rocking movement of the plate.

3. In a fishing lure, a spinner element, a rocking plate medially bent on a fore and aft line into substantially V-channel formation, having its concave side uppermost, the lateral halves of which are divergently disposed and alternately presented in different angular relation to the water pressure, and an oscillatory trailing element, interconnected in tandem relation.

4. In a fishing lure, a spoon element, a substantially moth shaped lure plate the inclined wings of which are upturned and alternately presented substantially broadside to the water pressure to effect a transverse rocking movement and a "bucktail" element interconnected in tandem relation with the rocking lure plate interposed between the spoon and "bucktail".

5. In a fishing lure, a leading spinner element, an intermediate lure plate having upturned angularly disposed wing portions subjected to alternating unequal water pressure effecting a transverse rocking movement, and a trailing member flexibly attached to the lure plate for transverse oscillatory movement.

6. In a fishing lure, a lure plate, a trailing member, and an intermediate flexible connection permitting a transverse oscillatory movement of the trailing member but resisting descent of the trailing member relative to the plate.

7. In a fishing lure, a lure member, a trailing member connected thereto, a spring tongue on one member and an eye carried by the other member to be detachably received by said spring tongue, said tongue and eye being capable of permitting free relative oscillatory movement of the lure and trailing members in one plane, but limiting their relative oscillatory movement in a direction perpendicular to said plane of oscillation.

8. In a fishing lure, a concavo-convex lure plate having its concave side uppermost capable of a transverse rocking movement about a medial line of draft, a trailing member provided with an attachment eye, and a reversely bent spring snap hook upon the lure plate with which the eye of the trailing member is engageable for transverse oscillatory movement.

9. In a fishing lure, a lure member, a flexibly connected trailing portion capable of free transverse oscillatory movement and an intermediate connection between said members limiting the descent of the trailing member below the plane of transverse oscillations while permitting vertical movement thereof above said plane.

10. In a fishing lure, a lure member, a flexibly connected trailing portion capable of free transverse oscillatory movement, an eye carried by one of the members, and a tapered hook carried by the other member for detachable engagement with the eye, the base of the tapered hook being sufficiently wide to limit the sliding movement of the eye thereon in one direction.

11. In a fishing lure, a lure member, a flexibly connected trailing portion capable of free transverse oscillatory movement, an eye carried by one member and a hook carried by the other member with which the eye is engaged, and means for limiting the movement of the eye upon the hook in one direction.

12. As an article of manufacture, a fish lure plate including angular wing portions extending in opposite directions from a medial line of draft, the plate being indented at its forward end and adapted for engagement of a draft connection within said indentation, the side portions of the plate extending forwardly beyond the point of draft connection.

13. As an article of manufacture, a fish lure plate including angularly disposed upwardly inclined wing portions extending on opposite sides of a medial line of draft and subject to transverse rocking movement about a line coincident with the angle of said wings, the plate being indented at its rearward end and adapted for engagement of a trailing balance portion within said indentation movable from side to side in accordance with the transverse rocking movement of the wings and governing the movement thereof, the side portions of the plate extending rearwardly beyond the point of engagement of such trailing portion.

14. As an article of manufacture, a fish lure plate having a point of draft attachment beneath the plate and rearwardly of its forward extremity, and a point of attachment for a trailing member forwardly of its rearward extremity, said plate being adapted to assume an inclined position to the line of draft.

15. As an article of manufacture, a fish lure plate of substantially moth shape having the side portions inclined to each other in a wide V shaped relation with its concave side uppermost and presenting unequal resistance to water pressure thereby causing the plate to rock transversely and a draft connection therefor so located as to present the plate in a forwardly and upwardly inclined position to the line of draft.

16. As an article of manufacture, a fish lure plate of substantially X shape and bent on a medial line to present the opposite sides in divergent planes having an attachment point for a draft connection in one of the terminal indentations of such X shaped form, and an attachment point for a trailing member in the other of said terminal indentations.

17. As an article of manufacture, a fish lure plate having divergently disposed wing portions, and a point of draft attachment so located that the plate is drawn through the water in an upwardly and forwardly inclined relation to the line of draft, said plate being capable of a to and fro rocking movement transversely to the line of draft in which, first one and then the other of its divergent wing portions is presented substantially perpendicular to the vertical plane of the line of draft and the other wing in inclined relation thereto whereby the water pressure on said wings is unequal, the water pressure on said perpendicularly disposed wing tending to force said wing upward and the other wing downward to such perpendicular position to alternate the position of the wings.

18. A fish lure plate including angularly disposed wing portions extending on opposite sides of a medial line of draft and presented to the water pressure in an upwardly and forwardly inclined relation to the line of draft, and a keel portion on the under side of said lure plate at the juncture of said angularly disposed wing portions and substantially aligned with the line of draft of said lure plate.

19. A fish lure plate so shaped and arranged that when drawn through the water its surfaces lying at opposite sides of a medial line of draft are presented in different angular relation to the direction of resistance of water pressure, whereby the unequal water pressure at opposite sides of its medial line will effect intermittent transverse oscillatory motion, and an oscillatory trailing member attached thereto and actuated at each lateral oscillation of the plate to carry the plate beyond an intermediate balanced position.

20. A fish lure comprising a plate bent on a medial line, coincident with the line of draft, to present its opposite halves in divergent planes, and attached to a draft device at a point rearwardly of its forward edge whereby the plate is drawn though the water in an upwardly and forwardly inclined position, and governing means causing first one inclined half and then the other inclined half of the plate to be presented substantially broad side to the water pressure while the opposite half is presented at an angle thereto, the predominant water pressure alternately upon the respective halves of the plate serving to intermittently oscillate the plate to reverse positions.

21. In a fishing lure an oscillatory plate member and a trailing member attached thereto, for relative oscillatory movement, the oscillatory movement of the trailing member being initiated by the tilting movement of the plate, the movement of the trailing member to alternate positions serving to overbalance the plate in its tilting movement causing it to be carried beyond an intermediate balanced position, first in one direction and then in the other, and to momentarily retard the return oscillation of the plate.

22. A fish lure plate shaped and arranged for transverse rocking movement about a fore and aft medial line under unequal influence of water pressure on different portions of the plate and a governing member exerting its influence to carry said plate first in one direction and then in the other past an intermediate balanced position to insure continuance of the rocking motion.

23. A fish lure including a plate bent into a substantially V channel formation having its concave side uppermost, an attachment lug for a draft line extending downwardly beyond the midline angle of the divergent portions of the plate adjacent to its forward end, and a trailing element flexibly connected to the plate adjacent to its rearward end and acting as a balance device governing the transverse oscillation of the plate about a medial longitudinal axis.

24. A lure plate for fishing purposes comprising a non-buoyant plate bent on a medial line to substantially V shape having its concave side upwardly disposed, and an attachment lug adjacent to the forward end of the plate and projecting downwardly from the angle of said plate and beyond the convex side thereof.

In testimony whereof, I have hereunto set my hand this 15 day of March A. D. 1927.

CARL H. SCHARRER.